July 9, 1940.　　　　　E. J. LYTLE　　　　　2,207,298
MEANS FOR PRODUCING NOISELESS FILM SPLICES
Filed Feb. 1, 1938

INVENTOR.
Earl J. Lytle
BY
Robt. L. Gunn
ATTORNEY.

Patented July 9, 1940

2,207,298

UNITED STATES PATENT OFFICE 2,207,298

MEANS FOR PRODUCING NOISELESS FILM SPLICES

Earl Jordan Lytle, Van Nuys, Calif., assignor to Twentieth Century-Fox Film Corporation Application February 1, 1938, Serial No. 188,104

11 Claims. (Cl. 95—75)

This invention relates to the art of making sound tracks and deals with a means for photographically treating splices in sound tracks during the printing operation to render them noiseless in the reproduction of sound.

The invention to be hereinafter described and claimed refers to a copending application, Serial Number 188,100, entitled a Method and means for producing noiseless film splices, filed February 1, 1938, by Robert Colby Stevens and Ralph Hunt Townsend, and shows another means for practising the method disclosed in the above mentioned application.

To those versed in this art it is known that a sound track when originally assembled comprises a number of sections of films spliced together. In practice, the splices are made by over-lapping short ends of films and cementing them together. During the printing operation these splices, unless properly treated on the negative, will print an image on to the positive film sound track that will produce objectionable noise termed a "bloop", when the positive is used for the reproduction of sound. It is an object of this invention to use the negative without any pretreatment of the splices and to provide a means whereby the film emulsion may be automatically fogged during the printing operation to produce a secondary photographic density on the positive over the image of the splice.

It is another object of this invention to produce a secondary photographic density over the image of the splice in the sound track that will pass a scanning slit without the secondary density introducing objectionable noise. In order to do this it is necessary that the density pass the scanning slit so that the photoelectric cell sees a change in density substantially corresponding to a sinusoidal curve.

To accomplish this it is necessary that the density on the film build up from zero to a maximum density which is arranged to fall over the image of the splice and decreases away from the splice in a reverse order. By forming this density of sufficient length the electrical response of the photoelectric cell will be a substantial sine curve response which will have a frequency below the audible range and thus be unobjectionable.

Another object of this invention is to utilize the double thickness of film at the splice for automatically operating the means for exposing the film to a light source for forming a density on the positive over the image of the splice. The invention to be hereinafter described has been illustrated in conjunction with a certain type of printing machine and special advantage has been taken of characteristic structure in this type of machine to operate my invention. However, the same or equivalent construction may be used on other printing devices or may be installed thereon, for automatically operating my invention.

Other objects and advantages such as compactness, simplicity of construction, accuracy of operation, and ease of installation, will become apparent as the description proceeds in conjunction with the drawing in which.

Figure 7:
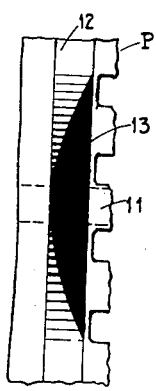
Figure 7 is an enlarged view of the splice covering.
Figure 6:
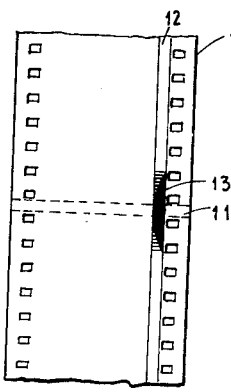
Figure 6 is a piece of film showing the manner in which the splices are treated in my invention.
Figure 5:
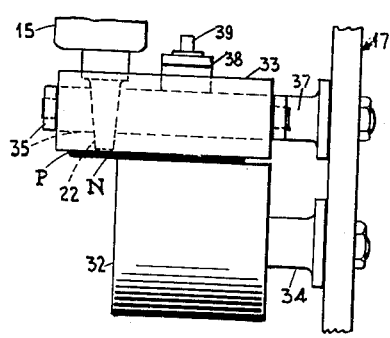
Figure 5 is a fragmentary top plan view taken on line 5—5, of Figure 2.

Referring to the drawing, and particularly to Figures 6 and 7, the shape and the size of the area of the sound track covered by emulsion density will be first described. It is to be understood that the film shown in this view is a positive print, designated P, which has been obtained by printing from a negative composed of two sections. The image of the splice is indicated by the dotted lines and is designated by numeral 11. As shown, the film carries a sound track designated 12. It is obvious that the image of the splice when run past a scanning slit would create objectionable noise, which as before stated is called a "bloop." Accordingly, my invention provides means for fogging the emulsion and producing a film density over the splice such as is indicated by the numeral 13. It will be noted that the fogged area 13 is a combination of variable area and variable density exposure. This is due to the fact that no lenses are used in my system. However, I do not wish to limit my invention to this particular type of covering since by the proper use of lenses I may make the covering either of a pure variable area or variable density covering. The type of covering shown has been found to be very satisfactory in practical use. The device for forming a covering of a nature shown will now be described.

Figure 1:
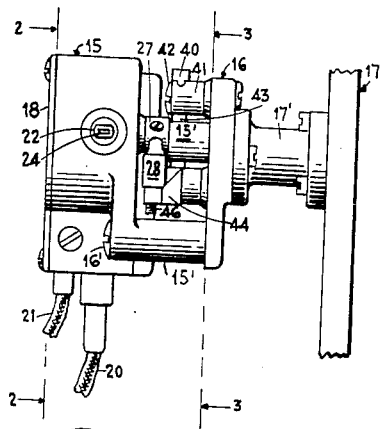
Figure 1 is an elevation of my device taken on line 1—1, Figure 2.
Figure 2:
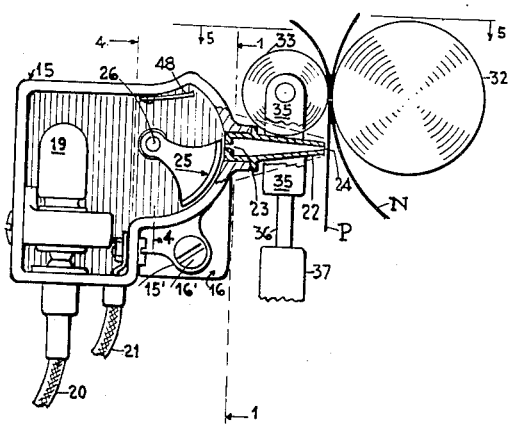
Figure 2 is a side view of my device with a cover plate removed taken on line 2—2, of Figure 1.
Figure 3:
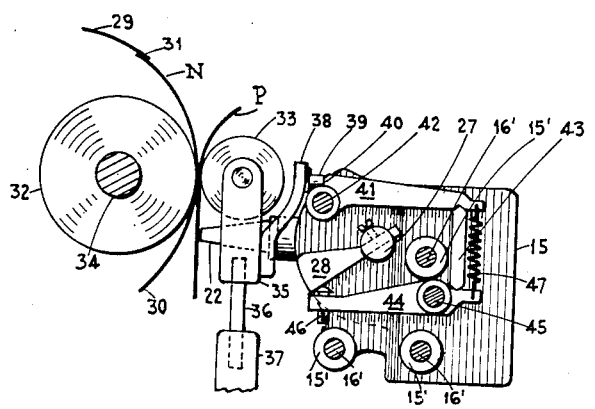
Figure 3 is a rear side view taken on line 3—3, of Figure 1.
Figure 4:
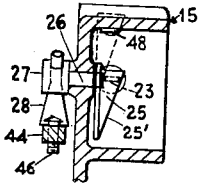
Figure 4 is a fragmentary section taken on line 4—4, of Figure 2.

In Figure 1, I have shown a general assembled view of my device as it may be mounted upon a printing machine. Generally speaking, the device consists of a casing 15 which is mounted upon a plate 16 by means of legs 15' and bolts 16'. The plate in turn is mounted upon a part of the printer designated 17 thru a pedestal 17'. The casing 15 is provided with a cover plate 18 which has been removed in the view shown in Figure 2. Here it will be noted that the casing contains a lamp 19 which provides the light for fogging the film. Current is supplied to the lamp through conductors 20 and 21 from any suitable source. The casing 15 is also provided with a light tube 22, said tube having a light slit 23 on the inner end thereof and another light slit 24 on the outer end. The object of the light slits is to confine the light passing to the film to direct rays from the light source 19. It will be noted that the outer end of the tube 22 is brought close to the film P which has been previously mentioned as the positive film. Referring again to the casing it will be seen that a shutter generally designated 25 is mounted over the light slit 23. The shutter in turn is mounted upon a shaft 26 rotatively supported in the rear wall of the casing and is formed with a diagonal edge 25' adapted to swing over the light slit 23 and meter the light passing thru the tube 22. The outer end of the shaft 26 is formed with a hub 27 and carries an arm 28 fixed thereto in any suitable manner. The purpose of the shutter 25 is to cover the light slit 23 at the inner end of the light tube 22, and the purpose of the arm 28 is to rotate the shaft 26 and swing the shutter to the dotted line position shown in Figure 4; thereby increasing the aperture and consequently the amount of light passing through the light tube and through the light slit 24 at the end of the barrel to the film P. Means is embodied in this invention for operating the shutter in the foregoing manner in timed relation to the passing of the splice in front of the slit 24. Such a means is best shown in Figure 3. In this view I have shown a negative, generally designated N, composed of two sections 29 and 30 having an over-lapping splice 31 connecting the two sections. The negative N and the positive P are fed between rollers 32 and 33. The roller 32 is mounted upon the printer frame 17 upon a rigid support 34 whereas the roller 33 is mounted in a yoke 35 which in turn is yieldingly held against the roller 32 by a spring member 36 mounted in a second member 37 which is rigidly supported upon the frame 17. As the films N and P are fed between the rollers, the splice 31, due to the double thickness of film, will force the roller 33 away from the roller 32 and supply the motion necessary to operate the shutter in the manner described with respect to Figure 4. In Figure 3, I have shown an arrangement of parts for transmitting the motion to the shutter. Here it will be noted that an arm 38 is attached to the yoke 35 and that the arm 38 carries a pin 39 that is arranged to engage a shoulder 40 upon an arm 41 pivotally mounted upon a pin 42 which is fixed in the plate 16. The outer end of the arm engages one end of a link member 43 while the other end of the link member engages a second arm 44 pivotally mounted upon a pin 45 fixed in the plate 16. The outer end of the arm 44 is arranged to engage the outer end of the member 28 and for this purpose may carry an adjusting screw 46. A spring 47 normally pulls the outer end of the arm 43 toward the arm 44 and holds the link member 43 in place. It will be noted that the fulcrum point of the upper end of the link member 43 is near the outer end of the arm 41, while the fulcrum point of the lower end of the link is near the pivot point of the arm 44. It will also be noted that the bearing point of the pin 39 on the arm 38 is near the pivot point of the arm 41. The result is that there is a large mechanical multiplication of movement. This multiplication is necessary in view of the slight movement of the roller 33 caused by a double thickness of film in passing thru the rollers to yield the necessary movement to throw the shutter the full distance required. It can be seen, therefore, that as soon as the splice strikes the contact point of the rollers, the outward movement of the roller 33 being multiplied by the lever system above mentioned causes the arm 44 to impact the member 28 and throw it suddenly upward, thus moving the shutter likewise. The movement of the shutter is, therefore, a quick reciprocating movement that opens and closes the light slit 23 in timed relation to the passing of the splice past the light tube 22. The source of light 19, being of constant illumination, supplies the light which reaches the film P, and the shape of the shutter determines the amount and shape of the exposure put upon the sound track. Due to the fact that a light tube having spaced light slits is used, the effective light is a combination of direct rays and reflected rays and the resultant exposure is accordingly a combination of variable area and variable density. If lenses were properly used the exposure could be confined to either variable area or variable density whichever was more desirable. It will also be noted that the light tube 22 is set slightly ahead of the contact point of the rollers. This is to allow the shutter to start opening ahead of the splice and results in beginning the exposure ahead of the splice. The second part of the exposure, or the decreasing part, is brought about by the return of the shutter to its normal position. The weight of the member 28 and of the shutter 25 is depended upon to return the shutter to its normal position and also to supply the necessary inertia for controlling the time of opening and closing of the shutter and consequently the length of the fogged area. However, I may use a spring 48 mounted in the upper wall of the casing 15 to give the shutter more resilience in its return movement. The over-all result is a rapidly uniformly increasing aperture with the closing of the aperture in substantially a reverse order. The exposure on the film is as shown in Figures 6 and 7, but as before stated may be of a variable density or of a variable area nature depending on whether or not lenses are used. In the drawing I have not shown any lenses; however, they could be used if desirable, and my invention is intended to cover the use of lenses.

In operation the negative is used without any treatment of the splices. As the splices pass between the rollers 32 and 33 the device is operated to fog the film over the splices in the manner described. The result is that the fogged area not only covers the image of the splice upon the positive but also is put on the positive in such a shape that in passing a scanning slit it will not in itself product an audible noise. The device is simple, practicable, and efficient, and may be mounted upon any type of printer.

I claim:

1. For use in a continuous film printer adapted to print a positive from a negative having splices therein, a device for forming secondary photographic densities over images of splices in sound tracks on said positive, said device including a light tight casing, a constant source of light in said casing, a slit in said casing arranged transversely to said sound track and adapted to pass light from said source to said sound track, a shutter reciprocably mounted on the wall of said casing, said shutter having a diagonal light cutting edge arranged to uncover and cover said light slit upon reciprocation of said shutter, and means actuated by the passing of a splice in said negative film past a predetermined point on said printer for reciprocating said shutter.

2. For use in a continuous film printer adapted to print a positive from a negative having splices therein, a device for forming secondary photographic densities over images of splices in sound tracks on said positive, said device including a light tight casing, a constant source of light in said casing, a slit in said casing arranged transversely to said sound track and adapted to pass light from said source to said sound track, a shutter arranged to reciprocate transversely of said slit and having a light cutting edge adapted to progressively uncover and cover said slit, and means actuated by the passing of a splice in said negative film past a predetermined point on said printer for reciprocating said shutter.

3. For use with a sound printer having a pair of rollers adapted to feed a positive and a negative film therebetween, with the pivot point of one of said rollers being moveable with respect to the other for passing splices in said negative film, a device for forming a secondary photographic density over images of splices in the sound track on said positive film, said device including a light tight casing, a light tube on said casing, said light tube having spaced light slits transversely of said sound track, a constant source of light, a shutter mounted upon a pivot in the wall of said casing, said shutter having a diagonal light cutting edge arranged to uncover and cover one of said light slits upon reciprocation of said shutter, a system of levers mounted upon said printer arranged to transmit a multiplied movement of said moveable roller caused by the passing of said splices between said rollers to reciprocate said shutter.

4. In a continuous film printer, a pair of rollers arranged to feed a positive and a negative film therebetween, one of said rollers being mounted upon a fixed pivot and the other roller being mounted upon a yieldably moveable pivot, a constant source of light, a light slit arranged transversely to a sound track in said positive film adapted to pass light from said source to said track, a shutter arranged over said slit, said shutter having a diagonal light cutting edge adapted to uncover and cover said light slit upon reciprocation of said shutter, and a system of levers arranged to reciprocate said shutter upon movement of said yieldably moveable roller caused by a film splice passing between said rollers.

5. In a continuous film printer, a pair of rollers arranged to feed a positive and a negative film therebetween, one of said rollers being mounted upon a fixed pivot and the other roller being moveable with respect to said first mentioned roller, a constant source of light, a light slit arranged transversely to a sound track in said positive film adapted to pass light from said source to said track, a shutter arranged to reciprocate transversely of said slit and having a light cutting edge adapted to progressively uncover and cover said slit, a pendulum weight attached to said shutter, an arm pivotally mounted on said printer adapted to engage said pendulum weight, a second arm pivotally mounted on said printer, a link connecting the outer end of said second arm to a point near the pivot point of said first mentioned arm, an arm mounted on said moveable roller adapted to engage a point near the pivot point of said second arm for transmitting movement of said moveable roller caused by the passing of splices between said rollers to reciprocate said shutter.

6. In a continuous sound track film printer the combination of: a pair of rollers arranged to feed a positive and a negative film therebetween, said negative film having splices therein; means for resiliently pressing one of said rollers against the other, and means for automatically fogging the sound track on said positive film over the images of splices therein, said means including a light tight casing having a light slit therein transversely to said sound track, a constant source of light in said casing adapted to transmit light through said slit to said sound track, a shutter having a diagonal light cutting edge adapted to reciprocate transversely of said light slit, and mechanical means for translating the movement of said resiliently pressed roller caused by a splice passing between said rollers for reciprocating said shutter.

7. For use in a continuous film printer adapted to print a positive from a negative having splices therein, a device for forming secondary photographic densities over images of splices in sound tracks on said positive, said device including a constant source of light, means for transmitting a line of light from said source to said positive transversely of said sound track, a reciprocable shutter having a diagonal light cutting edge arranged to progressively intercept light from said line of light and means actuated by the passing of said splices past a predetermined point on said printer for reciprocating said shutter.

8. For use in a continuous film printer, adapted to print a positive from a negative having splices therein, a device for forming secondary photographic densities over images of splices in sound tracks on said positive, said device including a secondary constant source of light, means for transmitting a line of light from said source to said positive transversely of said sound track, a reciprocable shutter arranged to normally completely intercept said beam of light, said shutter having a diagonal light cutting edge adapted to progressively pass light from said beam and to progressively intercept light from said beam in the order stated upon reciprocation of said shutter, and means actuated by the passing of said splices past a predetermined point on said printer for reciprocating said shutter.

9. In a continuous film printer, a pair of rollers arranged to feed a positive and a negative film therebetween, one of said rollers being mounted upon a fixed pivot and the other roller being mounted upon a yieldably moveable pivot, a secondary constant source of light, a light slit arranged transversely to a sound track in said positive film adapted to pass light from said source to said track, a reciprocable shutter arranged to normally cover said slit, said shutter having a diagonal light cutting edge adapted to uncover and cover said slit in the order stated upon reciprocation of said shutter, and a system of levers arranged to reciprocate said shutter upon movement of said yieldable moveable roller caused by a film splice passing between said rollers.

10. In a motion picture printer, a device for light-impressing an undeveloped motion picture film at predetermined intervals, said intervals being determined by the passage of film splices past a translation point, comprising means for advancing said film, a secondary source of light rays, means for defining said light rays into a beam of definite dimensions, means for shuttering said light rays from said film, means for impressing said light rays on said film, and means actuated by said splices for varying the position of said shuttering means in said light beam to vary the intensity of said beam reaching said film during passage of said splices past said translation point.

11. A motion picture device for light-impressing a motion picture film at predetermined intervals, said intervals being determined by the passage of film splices past a translation point, comprising means for advancing said film, a source of light rays, means for defining said light rays into a beam of definite dimensions, means for shuttering said light rays from said film, means for impressing said light rays on said film, and means actuated by said splices for varying the position of said shuttering means in said light beam to vary the intensity of said beam reaching said film during passage of said splices past said translation point.

EARL JORDAN LYTLE.